US012812739B2

(12) United States Patent
Wright et al.

(10) Patent No.: US 12,812,739 B2
(45) Date of Patent: Nov. 24, 2026

(54) INDUCTION HEATING ASSEMBLY

(71) Applicant: JT International SA, Geneva (CH)

(72) Inventors: Alec Wright, Guildford (GB); Andrew Robert John Rogan, Forres (GB)

(73) Assignee: JT International SA, Geneva (CH)

( * ) Notice: Subject to any disclaimer, the term of this patent is extended or adjusted under 35 U.S.C. 154(b) by 879 days.

(21) Appl. No.: 18/028,298

(22) PCT Filed: Sep. 27, 2021

(86) PCT No.: PCT/EP2021/076467

§ 371 (c)(1),
(2) Date: Mar. 24, 2023

(87) PCT Pub. No.: WO2022/064026

PCT Pub. Date: Mar. 31, 2022

(65) Prior Publication Data

US 2024/0057227 A1 Feb. 15, 2024

(30) Foreign Application Priority Data

Sep. 28, 2020 (EP) .................................... 20198667

(51) Int. Cl.
*H05B 6/44* (2006.01)
*A24F 40/20* (2020.01)
(Continued)

(52) U.S. Cl.
CPC ............. *H05B 6/44* (2013.01); *A24F 40/465* (2020.01); *H05B 6/06* (2013.01); *A24F 40/20* (2020.01); *H05B 2206/02* (2013.01)

(58) Field of Classification Search
CPC ........ A24F 40/10; A24F 40/20; A24F 40/465; A24F 40/50; H05B 6/06; H05B 6/36; H05B 6/42; H05B 6/44; H05B 2206/02
See application file for complete search history.

(56) References Cited

U.S. PATENT DOCUMENTS 4,790,624 A 12/1988 Van Hoye et al.
4,825,184 A 4/1989 Bloch et al.
(Continued)

FOREIGN PATENT DOCUMENTS

CN 110996696 A 4/2020
CN 111642818 A 9/2020
(Continued)

OTHER PUBLICATIONS

International Search Report for PCT/EP2021/076467 mailed Jan. 4, 2022. 3 pgs.

*Primary Examiner* — Elton K Wong
(74) *Attorney, Agent, or Firm* — Lerner David LLP

(57) ABSTRACT

An induction heating assembly for a vapour generating device is provided, the induction heating assembly including: an outer wall; an induction heating coil arranged inward of the outer wall and extending along the outer wall; a heating compartment defined inward of the outer wall and having a base portion at a first end of the induction coil and having an opening opposite of the base portion and arranged to receive, in use, via the opening, an elongated member to be heated by induction heating; and at least one movable member arranged such as to move in the longitudinal direction of the induction heating coil when a current is flowing through the induction heating coil.

20 Claims, 6 Drawing Sheets

(51) Int. Cl.
*A24F 40/465* (2020.01)
*H05B 6/06* (2006.01)

(56) References Cited

U.S. PATENT DOCUMENTS

| | | | | |
|---|---|---|---|---|
| 2001/0019052 | A1* | 9/2001 | Sadahira | H05B 6/36 219/629 |
| 2016/0113071 | A1* | 4/2016 | Willermoz | H05B 6/24 373/154 |
| 2020/0245682 | A1* | 8/2020 | Reevell | A24F 40/465 |
| 2021/0145062 | A1* | 5/2021 | Courbat | H05B 6/44 |
| 2021/0244096 | A1* | 8/2021 | Van Lancker | H05B 3/42 |
| 2022/0287376 | A1* | 9/2022 | Batista | A24F 40/42 |

FOREIGN PATENT DOCUMENTS

| | | | |
|---|---|---|---|
| KR | 200173118 | Y1 | 3/2000 |
| WO | 2019/030172 | A1 | 2/2019 |
| WO | 2019/129630 | A1 | 7/2019 |
| WO | 2019238814 | A1 | 12/2019 |
| WO | 2020/182750 | A1 | 9/2020 |

* cited by examiner

INDUCTION HEATING ASSEMBLY

CROSS-REFERENCE TO RELATED APPLICATIONS

The present application is a national phase entry under 35 U.S.C. § 371 of International Application No. PCT/EP2021/076467, filed Sep. 27, 2021, published in English, which claims priority to European Application No. 20198667.6 filed Sep. 28, 2020, the disclosures of which are incorporated herein by reference in their entireties.

TECHNICAL FIELD

The present invention relates to the field of induction heating assembly and in particular to induction heating assembly for a vapour generating device.

BACKGROUND

In the recent years devices which heat rather than burn or cause combustion of a substance to generate a vapour for inhalation by a user have become increasingly popular.

Such devices, commonly named vapour generating devices, are commonly handheld device. In general, such handheld vapour generating device may be said to belong to two groups: electronic cigarettes and tobacco vapour devices. Electronic cigarettes also called e-cigarettes, vaporizers or cig-a-likes are vapour generating device that simulate tobacco smoking and do not contain tobacco. These devices generate inhalable vapour by heating a liquid solution containing flavour releasing substance. An example of flavour releasing substance is nicotine. The liquid solution is also called e-liquid. The tobacco vapour devices, also known as heated tobacco products, on the other hand contain tobacco that is heated but not burned to create an inhalable vapour. In general, such e-liquid used in electronic cigarettes or tobacco used in tobacco vapour products may be called a vapour generating substance. Normally, the vapour generating substance is placed in a container, that may also be called cartridge or tobacco stick, that can be inserted in and removed from the vapour generating device by the user. Therefore, the container in which the vapour generating substance is placed is a consumable article and is also called consumable.

Regarding the heating of the vapour generating substance different vapour generating device may apply different approaches. One simple approach is based on electrical heating also known as resistive heating and involves providing an electrical power to a heating element which is in direct or indirect contact with the vapour generating substance. When the user activates the vapour generating device electrical power is provided to the heating element. The heating element is heated, which in turn heats the vapour generating substance to generate inhalable vapour that can be inhaled by the user.

Other approach is based on induction heating. In this approach an induction heating coil is provided in the vapour generating device and in addition an induction heatable element is provided. The induction heatable element is also called susceptor. The susceptor may be in direct or an indirect contact with the vapour generating substance. When an alternating electric current is provided to the induction heating coil an electromagnetic field (EM) is generated. The susceptor is placed in the electromagnetic field and absorbs the electromagnetic energy and converts it to heat. With the generated heat the vapour generating substance is heated and inhalable vapour is generated that can be inhaled by the user.

During use of the vapour generating device the induction heating coil becomes hot due to resistive losses occurring in the induction heating coil and due to the high electric current that is flowing through the induction heating coil. Therefore, it is desirable to provide efficient cooling for the induction heating coil.

In the art, for example as described in WO 2019/129630 A1, for increasing the efficiency of the cooling, routing of the incoming airflow over the induction heating coil is applied to use the heat generated in the induction heating coil to preheat the incoming airflow before it reaches the heating compartment where the vapour generating substance is placed. This cools the induction heating coil which allows it to function more efficiently.

Nevertheless, the cooling effect may not be sufficient due to the induction heating coil being normally concentrated in one part of the heating compartment. Therefore, there is a need to increase the efficiency of the cooling of the induction heating coil.

Even further, since normally the induction heating coil is concentrated in one part of the heating compartment the generated electromagnetic field is also concentrated in this part of the heating compartment. However, for efficient heating of the vapour generating substance it is necessary to modify the generated electromagnetic field over the course of the vapor generating session. Therefore, there is a need for providing an induction heating assembly that is able to modify the generated electromagnetic field and hence to modify the heating profile over the course of the vapour generating session.

One way to achieve this is to provide for a so-called segmented heating that allows for increased efficiency and faster heat-up times by directing the electrical power to a concentrated area of the vapour generating substance placed in the consumable. For heating based on induction heating, segmented heating is achieved by having multiple induction heating coils and multiple susceptors which makes the vapour generating device and the consumable more complex. Since normally the susceptor is placed in the vicinity of or within the vapour generating substance such that it is in direct or indirect contact with the vapour generating substance, the susceptor is normally housed in the consumable and not the vapour generating device. This causes waste of material for producing the susceptor and increases the manufacturing costs.

Therefore, there is a need for an improved induction heating assembly for a vapour generating device that has not only efficient cooling of the induction heating coil but also enables for modification of the heating profile during the course of the vapor generating session without increasing the complexity of the vapour generating device.

SUMMARY

The mentioned problems and objects are met by the subject-matter of the independent claims. Advantageous embodiments are defined in the dependent claims.

According to one embodiment of the present invention there is provided an induction heating assembly for a vapour generating device, the induction heating assembly comprising:

an outer wall;

an induction heating coil arranged inward of the outer wall and extending along the outer wall;

a heating compartment defined inward of the outer wall and comprising a base portion at a first end of the induction coil and having an opening opposite of the base portion and arranged to receive, in use, via the opening, an elongated member to be heated by induction heating; and at least one movable member arranged such as to move in the longitudinal direction of the induction heating coil when a current is flowing through the induction heating coil.

BRIEF DESCRIPTION OF THE DRAWINGS

Embodiments of the present invention which are presented for better understanding the inventive concept of the present invention, but which are not to be seen as limiting the present invention, will now be described with reference to the figures in which.

DETAILED DESCRIPTION

Figure 1A:
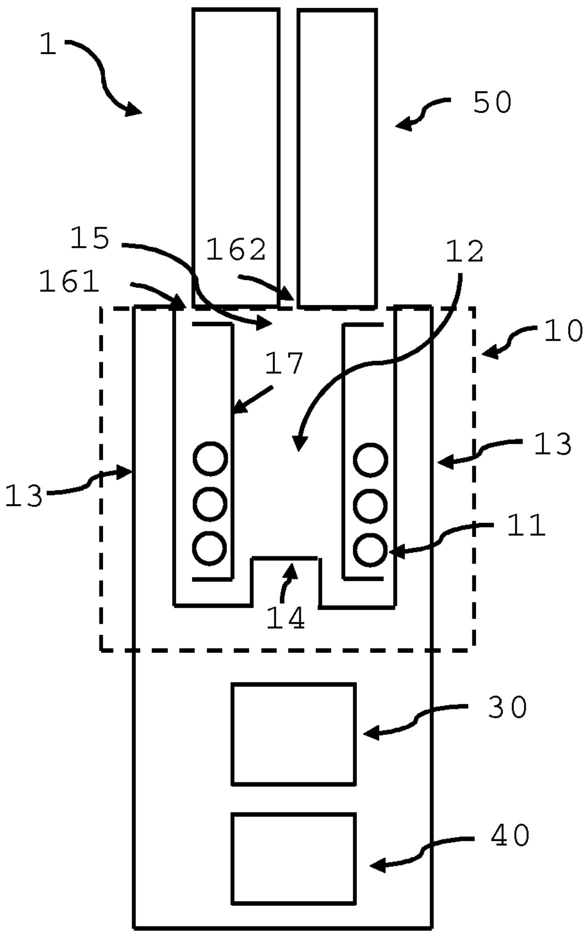
FIGS. 1*a* and 1*b* show a schematic view of a handheld vapour generating device with and without a consumable according to an embodiment of the present invention.

FIG. 1*a* shows a schematic view of the vapour generating device 1 according to an embodiment of the present invention comprising an induction heating assembly 10 according to an embodiment of the present invention.

The vapour generating device 1 is a handheld device having an elongated form. The vapour generating device 1 is a handheld device in the sense that it can be held by a user without any aid and difficulty with one hand. The vapour generating device 1 may have but is not limited to a circular or rectangular or elliptical cross-section. The vapour generating device 1 may have any other cross-section that is particularly suitable for the vapour-generating device 1 to be held by the user un-aided with one hand. Even further, some portions of the vapour generating device 1 may have one type of cross-section while other portions of the vapour generating device may have other type of suitable cross-section.

FIG. 1*a* shows the vapour generating device 1 as comprising three portions: upper portion, middle portion and lower portion. The upper portion may comprise a mouthpiece 50 through which the user can inhale the generated vapour. The mouthpiece 50 is detachably mounted to the middle portion. The mouthpiece 50 being detachably mounted to the middle portion means that the mouthpiece 50 may be completely or partially dismounted by the user and the user may thus gain an access to at least part of the middle portion. In a different embodiment of the present invention the vapour generating device 1 may not comprise the upper portion, and in particular the vapour generating device 1 may not comprise the mouthpiece 50.

The middle portion comprises the induction heating assembly 10. The induction heating assembly 10 comprises an outer wall 13, an induction heating coil 11 defined inward of the outer wall 13 and a heating compartment 12 defined inward of the outer wall 13. The heating compartment 12 comprises a base portion 14 at a first end of the induction coil 11, also called a first longitudinal end of the induction heating coil 11 and has an opening 15 opposite of the base portion 14. The heating compartment 12 is arranged to receive, in use, via the opening 15, an elongated member to be heated by induction heating. In use means that the user may insert the elongated member in the heating compartment 12 via the opening 15 by completely or partially dismounting the mouthpiece 50.

Such elongated member in general comprises a vapour generating substance to generate a vapour when heated. Such elongated member comprising a vapour generating substance will be here below also called a consumable.

Figure 1B:
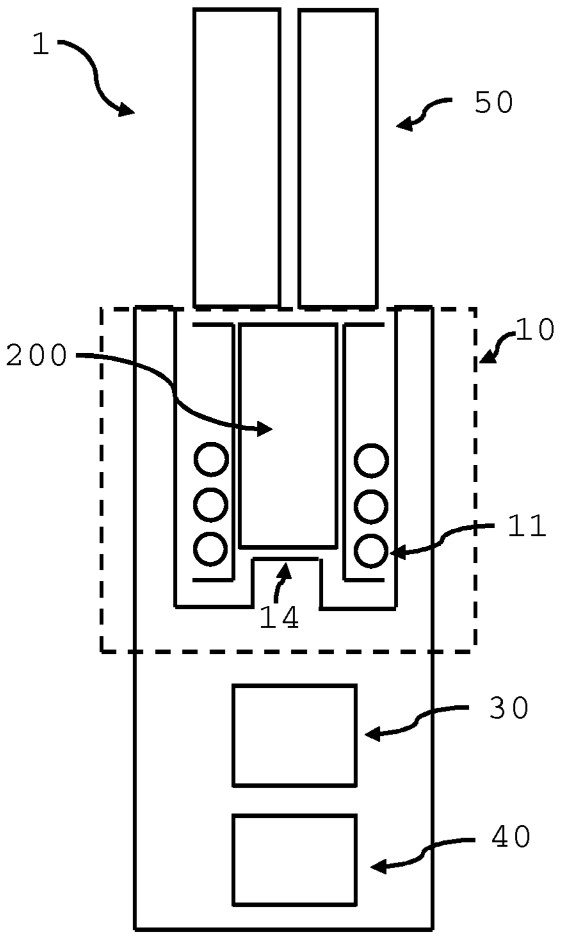

FIG. 1*b* shows a schematic view of the vapour generating device 1 with the inserted consumable 200. For this, in this embodiment of the present invention the user dismounts completely or at least partially the mouthpiece 50 and inserts the consumable 200 in the heating compartment 12 via the opening 15. The vapour generating device 1 according to the embodiment of the present invention with the consumable 200 inserted in the heating compartment 12 may also be called a vapour generating system. In other words, a vapour generating system according to the present invention comprises the vapour generating device 1 according to different embodiments of the present invention and the consumable 200. Such system is shown schematically in FIG. 1*b*.

The heating compartment 12 is in gaseous connection with an air inlet 161 formed in the induction heating assembly 10 and an air outlet 162. When the mouthpiece 50 is mounted the air outlet 162 extends through the mouthpiece 50. This allows air to be drawn by the user through the air outlet 162.

In one embodiment of the present invention the induction heating coil 11 has a cylindrical form, such that the form of the heating compartment 12 is also cylindrical. The heating compartment 12 is defined radially inward of the induction heating coil and has wall 17 around a radially inner side of the induction heating coil 11.

The induction heating assembly 10 comprises further at least one movable member (not shown in FIGS. 1*a* and 1*b*) arranged such as to move in the longitudinal direction of the induction heating coil 11 when a current is flowing through the induction heating coil 11. Details of the at least one movable member according to different embodiments of the present invention will be described further below.

As further shown in FIG. 1*a* the lower portion of the vapour generating device 1 comprises a control unit 40 and a power source 30. The power source 30 is electrically connected to the induction heating coil 11. The power source 30 may be a rechargeable battery or any other kind of power source suitable to supply electric current to the induction heating coil 11. The control unit 40 is configured to regulate the electric current supplied from the power source 30 to the induction heating coil 11. In particular, the control unit 40 is configured to issue instructions for regulating the electric current supplied from the power source 30 to the induction heating coil 11.

As elaborated above, the consumable 200 to be heated by induction heating comprises vapour generating substance 201. FIGS. 2*a*, 2*b*, 2*c* and 2*d*, details of which will be elaborated further below, show different examples of consumables 200 that can be inserted by the user in the heating compartment 12. However, the shown consumables are not to be seen as limiting to the present invention.

In some embodiments of the present invention the vapour generating substance 201 is a liquid solution containing flavour releasing substance, also called e-liquid. The flavour releasing substance may and may not comprise nicotine. In other embodiments of the present invention the vapour generating substance 201 is a tobacco. In some embodiments of the present invention the consumable 200 may further comprise a filter portion 202 arranged to filter the generated vapour.

In some embodiments of the present invention the consumable 200 may further comprise an induction heatable element 210, also called a susceptor 210. The susceptor 210 is comprised of at least one electrically conducting element that is arranged to be in direct or an indirect contact with the vapour generating substance 201. In another embodiment of the present invention described in more details further below, the susceptor 210 is housed in the induction heating assembly 10 and not the consumable 200.

As elaborated above, FIGS. 2*a*, 2*b*, 2*c* and 2*d* show examples of different consumables 200 that can be inserted by the user in the heating compartment 12 and hence can be used with the vapour generating device 1 according to different embodiments of the present invention.

Figure 2A:
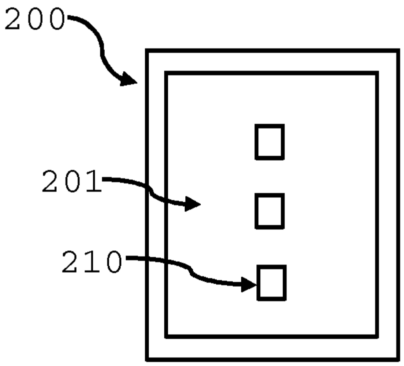
FIGS. 2*a*, 2*b*, 2*c* and 2*d* show examples of different consumables that can be used with the vapour generating device according to different embodiments of the present invention.

FIG. 2*a* presents a schematic view of a consumable 200 comprising a vapour generating substance 201 and a susceptor 210 being arranged in direct or indirect contact with the vapour generating substance 201. The susceptor 210 is a plurality of electrically conducting elements arranged at different positions within the vapour generating substance 201.

Figure 2B:
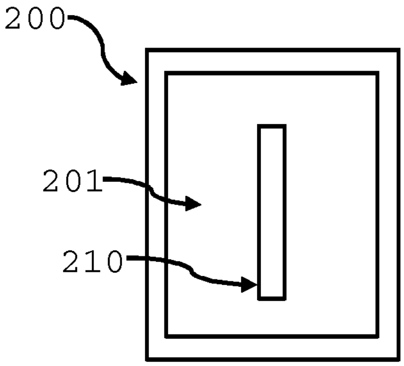

FIG. 2*b* presents a schematic view of a different consumable in which the susceptor 210 is a single electrically conducting element extending along the longitudinal direction of the consumable 200 arranged in a direct or indirect contact within the vapour generating substance 201.

Figure 2C:
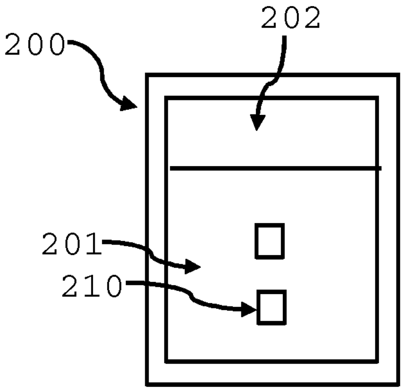

FIG. 2*c* shows a yet further consumable 200 which differs from the consumable 200 shown in FIG. 2*a* in that it further comprises a filter portion 202. Although the susceptor 210 is presented with a plurality of electrically conducting elements arranged at different positions within the vapour generating substance 201 as shown in FIG. 2*a*, the susceptor may also be a single electrically conducting element extending along the longitudinal direction of the consumable 200 as shown in FIG. 2*b*.

Figure 2D:
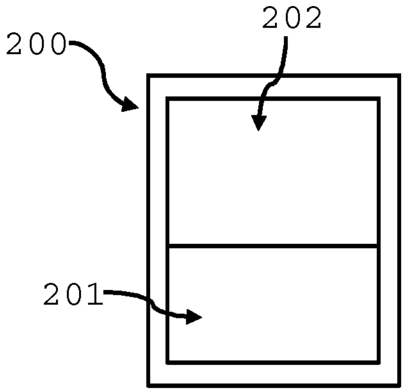

FIG. 2*d* shows a consumable 200 comprising a filter portion 202 and a vapour generating substance 201, however the consumable 200 does not comprise a susceptor. The vapour generating substance 201 may be a tobacco. Such consumable 200 may also be called a tobacco stick.

Although FIGS. 2*a*, 2*b*, 2*c* and 2*d* show the consumable 200 as having a rectangular cross-section, in the embodiment of the present invention in which the heating compartment 12 has a cylindrical form and hence has a circular cross-section the consumable 200 also has a circular cross-section. The consumable 200 may also have any other cross-section which enables that the consumable 200 is placed within the heating compartment 12.

When the user activates the vapour generating device 1 by, for example pressing a button or tapping gently at the device predetermined number of times at a predetermined frequency, the power source 30 starts supplying electric current to the induction heating coil 11. The power source 30 supplies normally a direct electric current. The direct electric current is converted to an alternating current (for example by a conversion circuit, not shown in FIGS. 1*a* and 1*b*) which is supplied to the induction heating coil 11 which in turn generates an electromagnetic field (EM).

The susceptor 210, which may be housed in the consumable, examples of which are shown in FIGS. 2*a*, 2*b* and 2*c*, is arranged in the generated electromagnetic field when the consumable 200 is inserted in the heating compartment 12 and absorbs the electromagnetic energy and converts it to heat. In some embodiments of the present invention, described in more details further below, the susceptor 210 is housed in the induction heating assembly 10 instead the consumable 200 and is arranged in the induction heating assembly 10 such that it is arranged in the generated electromagnetic field. The susceptor 210 that is arranged in the generated electromagnetic field absorbs the electromagnetic energy and converts it to heat. With the generated heat the vapour generating substance 201 is heated and vapour is generated that can be inhaled by the user.

The start of the electric current flowing through the induction heating coil 11 here below will also be called start of the vapour generating session. On the other hand, the termination of the current flowing through the induction heating coil 11 here below will also be called termination of the vapour generating session.

In some embodiments of the present invention the vapour generating device 1 may comprise more than or less than the above described three portions. For example, as elaborated above, the vapour generating device 1 may not comprise the upper portion. In particular, the vapour generating device 1 may not comprise the described mouthpiece 50. For example, in one embodiment of the present invention, in which the consumable 200 that may be inserted in the heating compartment 12 of the induction heating assembly 10 is the consumable 200 described in relation to FIG. 2*c* or FIG. 2*d* which comprises the filter portion 202, the vapour generating device 1 may not comprise the described mouthpiece 50. The user may inhale the generated vapour through the filter portion 202 of the consumable 200, similar to a conventional cigarette.

As elaborated above, the induction heating assembly 10 comprises at least one movable member arranged such as to move in the longitudinal direction of the induction heating coil 11 when a current is flowing through the induction heating coil 11.

Figure 3B:
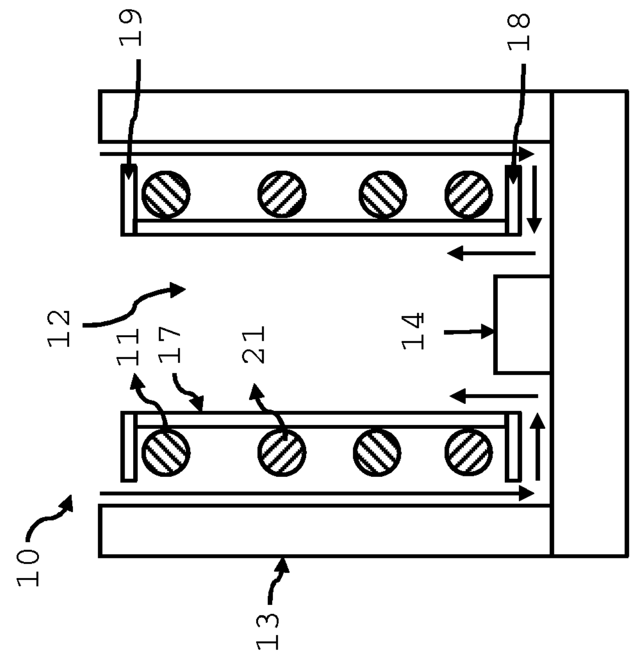
FIGS. 3*a* and 3*b* show a schematic view of the induction heating assembly according to an embodiment of the present invention in two different states: "cold" state and "hot" state.

In one embodiment of the present invention described here below with reference to FIGS. 3*a* and 3*b* the movable member is a further coil 21, here below also called movable coil 21.

Figure 3A:
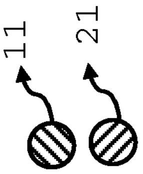

As shown in FIG. 3*a* the movable coil 21 is arranged such that at least one winding of the movable coil 21 is arranged between two adjacent windings of the induction heating coil 11. FIG. 3*a* shows a state of the vapour generating device 1 in which there is no electric current flowing through the induction heating coil 11. Here below this state of the vapour generating device 1 will be called a “cold” state. In this state the windings of the induction heating coil 11 and the movable coil 21 are close together. The induction heating coil 11 is electrically insulated from the movable coil 21.

The induction heating coil 11 may be made of copper litz wire. As elaborated above, when the user activates the vapour generating device 1 by, for example pressing a button or tapping gently the device predetermined number of times at a predetermined frequency, the power source 30 starts supplying electric current to the induction heating coil 11. As the time during which electric current is flowing through the induction heating coil 11 increases and accordingly the vapour generating session progresses, the induction heating coil 11 heats up. As elaborated above, the induction heating coil 11 heats up because of resistive losses occurring in the copper litz wire. Further, the induction heating coil 11 may also heat up and hence the temperature of the induction heating coil may also increase because of the high electric current that is flowing through the induction heating coil 11.

The state of the vapour generating device 1 in which electric current is flowing through the induction heating coil 11 and the temperature of the induction heating coil 11 is higher than the temperature of the induction heating coil 11 before the electric current starts to flow through the induction heating coil 11 will be called here below "hot" state.

FIG. **3*b*** shows the induction heating assembly in the "hot state".

The movable coil 21 is arranged to move in the longitudinal direction of the induction heating coil 11 based on the temperature of the induction heating coil 11 to thereby change the winding pitch of the induction heating coil 11. The winding pitch of the induction heating coil 11 is the distance between centres of neighbouring turns of the induction heating coil 11.

The movable coil 21 is arranged to expand in the longitudinal direction of the induction heating coil 11 when current is flowing through the induction heating coil 11 to thereby increase the winding pitch of the induction heating coil 11. In particular, the movable coil 21 is arranged to expand in the longitudinal direction of the induction heating coil 11 as the temperature of the induction heating coil 11 increases (the above-mentioned "hot state") to thereby increase the winding pitch of the induction heating coil 11. As the movable coil 21 expands in the longitudinal direction the windings of the movable coil 21 press or push the windings of the induction heating coil 11 and thereby the winding pitch of the induction heating coil 11 increases.

The movable coil 21 is further arranged to contract in the longitudinal direction of the induction heating coil 11 as the temperature of the induction heating coil 11 decreases. The temperature of the induction heating coil 11 decreases when the amount of the electric current supplied to the induction heating coil 11 decreases or when the power source 30 terminates the supply of electric current to the induction heating coil (when the vapour generating session is terminated). As the movable coil 21 contracts in the longitudinal direction the windings of the movable coil 21 depress the windings of the induction heating coil 11 and thereby the winding pitch of the induction heating coil 11 decreases.

The movable coil 21 is arranged to expand and contract in the longitudinal direction of the induction heating coil 11 based on the temperature of the induction heating coil 11 since the movable coil 21 is made of a material that undergoes a transformation based on the temperature of the material. This transformation comprises at least expansion as the temperature of the material is increasing and contraction as the temperature of the material is decreasing after increasing. The expansion and contraction may be reversible. The expansion of the movable coil 21 may also be referred to as movement of the movable coil 21. Similar, the contraction of the movable coil may also be referred to as movement of the movable coil. When the induction heating coil 11 heats up heat is transferred from the induction heating coil 11 to the surrounding environment and hence also the movable coil 21 heats up and accordingly expands. On the other hand, when the induction heating coil 11 cools down, the movable coil 21 also cools down and accordingly contracts.

In one embodiment of the present invention the material of the movable coil 21 is a shape memory alloy.

In another embodiment of the present invention the material of the movable coil 21 is a bimetallic material. Preferably the bimetallic material has a low Curie temperature. In one embodiment of the present invention it may be more preferable to use bimetallic material with a low Curie temperature instead of a shape memory alloy. This ensures a more gradual widening of the induction heating coil 11 winding pitch. It is preferable to use a bimetallic material with a low Curie temperature for avoiding the bimetallic strip to heat up in the generated electromagnetic field.

As shown in FIGS. **3*a* and 3*b* the induction heating assembly 10 comprises further a first coil retaining wall 18 at the first longitudinal end of the induction heating coil 11 and the movable coil 21 and a second coil retaining wall 19 at an opposite longitudinal end of the induction heating coil 11 and the movable coil 21. The induction heating coil 11 is arranged such that a first gap is formed between the terminating winding of the induction heating coil 11 and the second coil retaining wall 19 and the movable coil 21 is arranged such that a second gap is formed between the terminating winding of the movable coil 21 and the first coil retaining wall 18. The first gap is larger than the second gap. The first coil retaining wall 18 and the second coil retaining wall 19 are orthogonal to the wall 17 of the heating compartment 12**.

The movable coil 21 is arranged to expand towards the second coil retaining wall 19 to thereby expand the induction heating coil 11 towards the second coil retaining wall 19 when current is flowing through the induction heating coil 11. In particular, the movable coil 21 is arranged to expand towards the second coil retaining wall 19 to thereby expand the induction heating coil 11 towards the second coil retaining wall 19 as the temperature of the induction heating coil 11 increases, as shown in FIG. **3*b***.

As the induction heating coil 11 expands as the temperature of the induction heating coil 11 increases the surface area of the induction heating coil 11 expands which increases the cooling efficiency of the induction heating coil 11.

Another advantage is related to the modification of the generated magnetic field during the course of the vapour generating session. In the beginning of the vapour generating session the windings of the induction heating coil 11 are close together and the generated electromagnetic field is concentrated in a particular position in the heating compartment 12. This can be used to ensure a fast first puff when the user activates the vapour generating device 1 by concentrating the generated electromagnetic filed on a particular part of the susceptor 210. As the vapour generating session progresses the induction heating coil 11 will become more spread out and thus heating will be spread out over the whole susceptor 210.

Figure 3A:
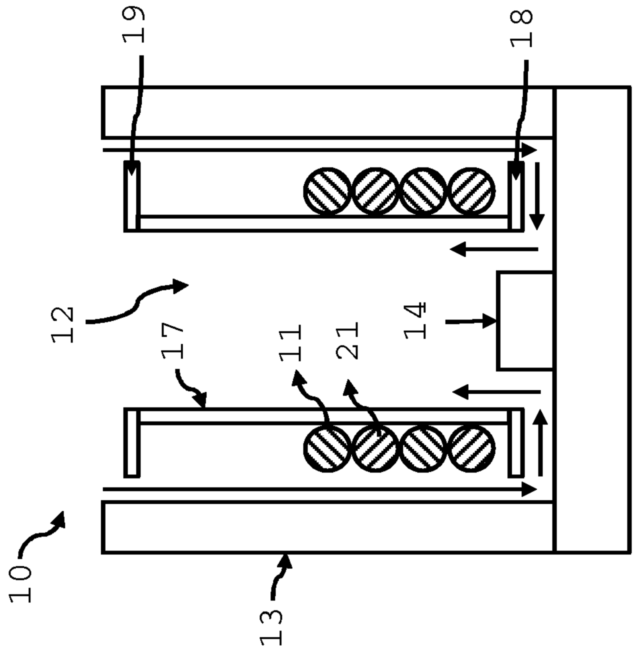

As elaborated above the increase of the surface area of the induction heating coil 11 causes an increase in the cooling efficiency of the induction heating coil 11. The arrangement of the induction heating assembly 10 in this embodiment of the present invention is such that also routing of the incoming airflow over the induction heating coil 11, as described in WO 2019/129630 A1 may be used for additional cooling of the induction heating coil 11. For this, as shown in FIGS. **3*a* and 3*b* a separation is formed between the outer wall 13 and the induction heating coil 11 which defines an air vent arranged to allow air flowing around the induction heating coil 11 and the movable coil 21 and to the heating compartment 12. In FIGS. 3***a* and 3*b* the air flow through the air vent is shown with arrows.

In the above embodiment it has been described that the induction heating coil 11 is arranged close to the base portion 14 of the heating compartment 12 and expands toward the second coil retaining wall 19. The skilled person easily recognizes that the induction heating coil 11 may by arranged close to the opening 15 of the heating compartment 12 and expand toward the base portion 14 of the heating compartment 12.

In other embodiments of the present invention the movable member is a susceptor 210. These embodiments are described further below with reference to FIGS. 4*a*, 4*b*, 4*c*, 4*d*, 5*a* and 5*b*.

Figure 4A:
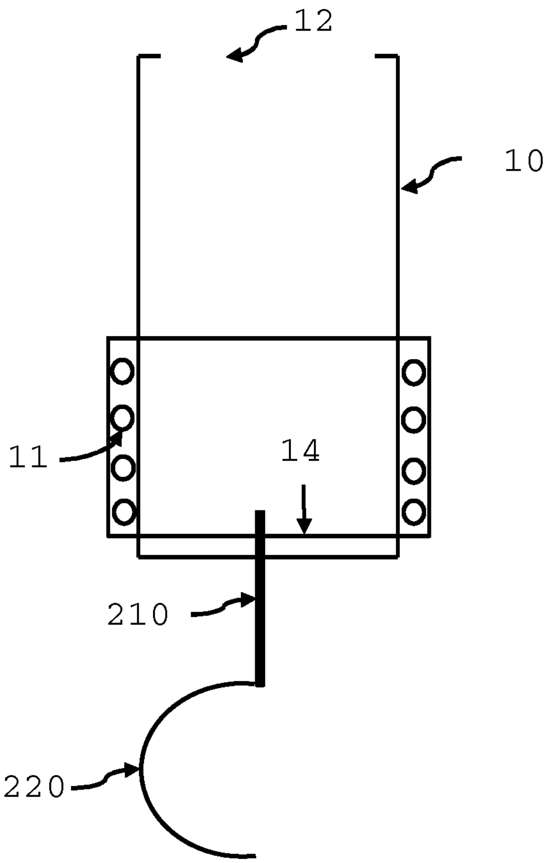
FIGS. 4*a* and 4*b* shows a schematic view of the induction heating assembly according to an embodiment of the present invention in two different states: "cold" state and "hot" state.

FIG. 4*a* shows the susceptor 210 as having an elongated form with a first end and second end. The susceptor 210 is arranged in the induction heating assembly 10 such as to penetrate through the base portion 14 of the heating compartment 12 with the first end protruding in the heating compartment 12. In particular, the susceptor 210 may have a shape of a blade or a needle.

Figure 4B:
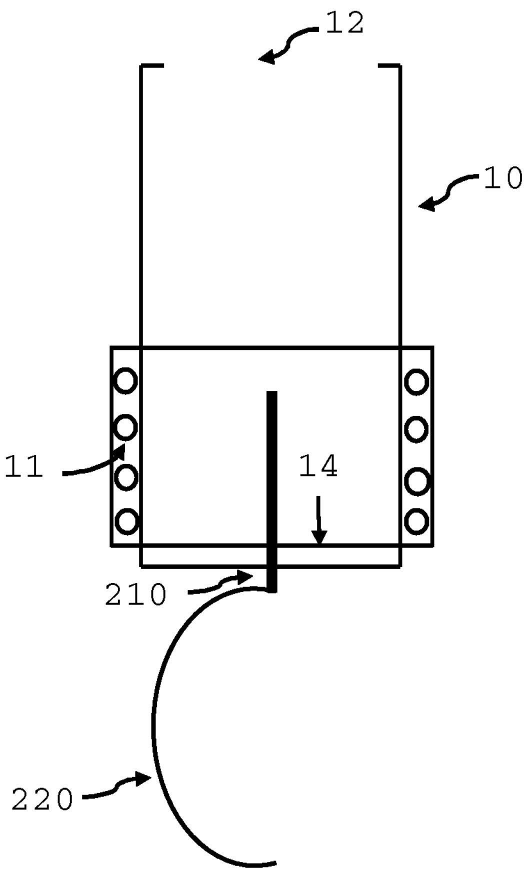

The induction heating assembly 10 comprises further an expandable member 220. The expandable member 220 is arranged such that one end of the expandable element 220 is coupled to the second end of the susceptor 210. The expandable member 220 is arranged to expand as the temperature of the expandable member 220 increases when current is flowing through the induction heating coil 11 to thereby push the susceptor 210 further into the heating compartment 12 as shown in FIG. 4*b*.

In one embodiment of the present invention the expandable member 220 is arranged in the induction heating assembly such as it is thermally coupled to the second end of the susceptor 210. The expandable member 220 is made of a material that undergoes a transformation based on the temperature of the material. This transformation comprises at least expansion as the temperature of the material is increasing and contraction as the temperature of the material is decreasing after increasing. The expansion and contraction may be reversible. The expansion and contraction of the expandable member 220 may also be referred to as movement of the expandable member 220.

Figure 4C:
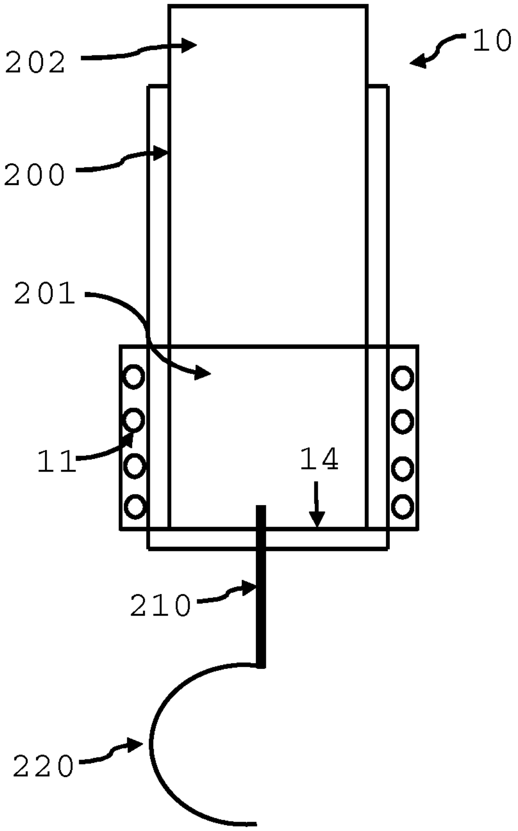
FIGS. 4*c* and 4*d* shows a schematic view of the induction heating assembly according to an embodiment of the present invention in two different states: "cold" state and "hot" state with an inserted consumable.

FIG. 4*c* shows the induction heating assembly 10 according to this embodiment of the present invention with a consumable 200 inserted in the heating compartment 12 of the induction heating assembly 10. The consumable 200 is the consumable 200 shown in FIG. 2*d*. The vapour generating substance 201 is tobacco. As shown in FIG. 4*c* when the consumable 200 is inserted in the heating compartment 12 of the induction heating assembly 10 the consumable 200 is inserted such that the tobacco portion 201 is facing the base portion 14 of the heating compartment 12 and the filter portion 202 is in the upper part of the heating compartment 12. Since the susceptor 210 is arranged in the induction heating assembly 10 such as to penetrate through the base portion 14 of the heating compartment 12 with a first end of the susceptor 210 protruding in the heating compartment 12 when the consumable 200 is inserted in the heating compartment 12 as described above the susceptor 210 pierces only the very bottom of the tobacco portion 201.

When the user activates the vapour generating device 1 by, for example pressing a button or tapping gently the device predetermined number of times at a predetermined frequency, the power source 30 starts supplying electric current to the induction heating coil 11, the susceptor 210 is being heated as elaborated above. The vapour generating session starts.

Figure 4D:
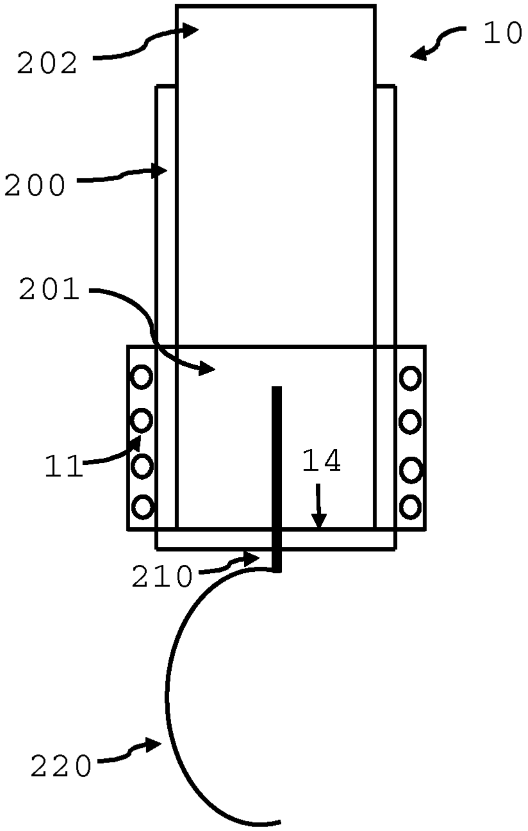

As the vapour generating session progress the susceptor 210 heats up and accordingly, the expansion member 220 being thermally coupled to the second end of the susceptor 210 also heats up and expands and thereby pushes the susceptor 210 further into the tobacco portion 201. Therefore, new part of the tobacco portion 201 is heated as the vapour generating session progresses. This is shown in FIG. 4*d*.

When the power source 30 stops the supply of electric current to the induction heating coil 11, and hence the vapour generating session terminates, no electromagnetic field is generated. The susceptor 210 starts to cool down. The expandable member 220 which is in thermal communication with the susceptor 210 also starts to cool down. The user may remove the consumable 200 from the vapour generating device 1. As the expandable member 220 cools down, it contracts and thereby moves the susceptor 210 back towards its original position. In the embodiment in which the expandable member 220 contracts entirely reversible the susceptor 210 is returned to its original position.

Accordingly, as the vapour generating session progresses the susceptor 210 is moving further in the tobacco portion 201 and thereby provides segmented heating.

In comparison to vapour generating devices in which multiple stationary susceptors are provided for segmented heating in this embodiment of the present invention segmented heating is achieved with a single susceptor 210. This simplifies the design of the vapour generating device 1 and the consumable 200.

Further, in this embodiment of the present invention the susceptor 210 is reusable since it is housed in the induction heating assembly 10 of the vapour generating device 1 and not the consumable 200 which reduces the manufacturing costs and offers a more sustainable product.

The expandable member 220 may be a bimetallic leaf spring as shown in FIGS. 4*a*, 4*b*, 4*c* and 4*d*.

Figure 5A:
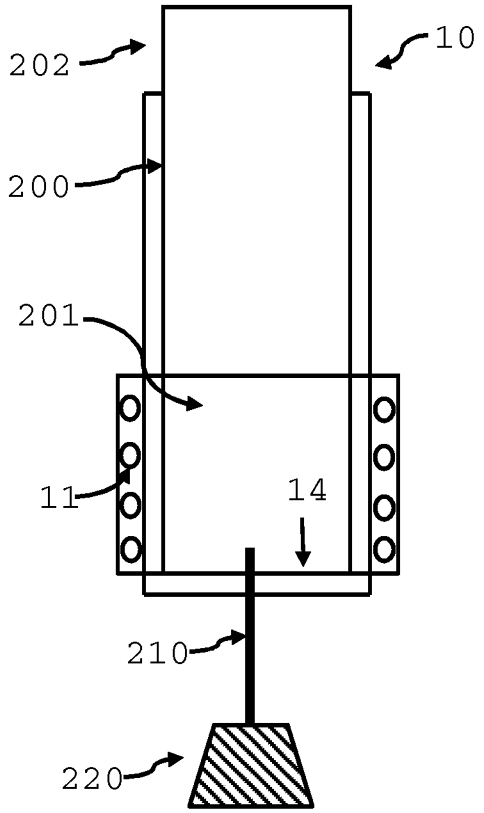
FIGS. 5*a* and 5*b* shows a schematic view of the induction heating assembly according to an embodiment of the present invention in two different states: "cold" state and "hot" state with an inserted consumable.
Figure 5B:
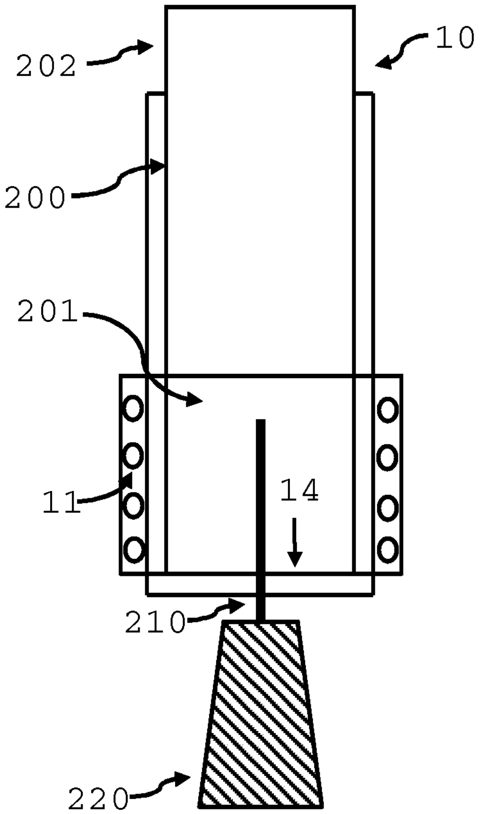

In another embodiment of the present invention the expandable member 220 may be a bimetallic coil spring as shown in FIGS. 5*a* and 5*b* which schematically show the induction heating assembly 10 with the consumable 200 inserted in the heating compartment 12 of the induction heating assembly 10. Here again FIG. 5*a* shows the susceptor 210 piercing only the bottom of the tobacco portion 201 of the consumable 200 that is inserted in the heating compartment 12. FIG. 5*b* shows the susceptor being pushed further into the tobacco portion as the bimetallic coil spring 220 heats up as the vapour generating session progresses.

The induction heating coil 11 has approximately the length of the tobacco portion 201 of the consumable 200. The induction heating coil 11 may also cover only the bottom portion of the consumable 200. The tobacco portion 201 may have a length of approximately 18 mm. The expandable member 220 may expand approximately 10 mm.

In one embodiment of the present invention the susceptor 210 may comprise a conductive tip and a conductive core. The conductive core is surrounded by electrically insulating material. The electrically insulating material may comprise plastic material. This enables that the generated electromagnetic field is shielded so the hottest portion of the susceptor 210 is the tip while still convection of heat to the expandable member 220 is possible.

In a different embodiment of the present invention the expandable member 220 is its self-heated by induction heating as oppose to just being heated through thermal communication with the susceptor 210. In still further embodiment of the present invention the susceptor 210 is formed of a bimetallic material. This reduces further the number of components of the induction heating assembly 10 and simplifies the vapour generating device 1 design.

In this embodiment of the present invention in which the movable member is the susceptor 210, the induction heating assembly 10 may not comprise the above-described movable coil 21. In a different embodiment of the present invention the induction heating assembly 10 may comprise two movable members: the susceptor 210 as movable member and the movable coil 21 as movable member.

In the embodiment of the present invention in which the induction heating assembly 10 comprises two movable members: the susceptor 210 as movable member and the movable coil 21 as movable member the control unit 40 may control the electric current supplied from the power source 30 to the induction heating assembly 10 such that the second end of the induction heating coil 11 tracks the first end of the susceptor 210.

Although detailed embodiments have been described, these only serve to provide a better understanding of the invention defined by the appended claims and are not be seen as limiting.

The invention claimed is:

1. An induction heating assembly for a vapour generating device, the induction heating assembly comprising:

an outer wall;

an induction heating coil arranged inward of the outer wall and extending along the outer wall;

a heating compartment defined inward of the outer wall and comprising a base portion at a first end of the induction heating coil and having an opening opposite of the base portion and arranged to receive, in use, via the opening, an elongated member to be heated by induction heating; and at least one movable member arranged such as to move in a longitudinal direction of the induction heating coil when a current is flowing through the induction heating coil, wherein the at least one movable member includes a movable coil arranged such that at least one winding of the movable coil is arranged between two adjacent windings of the induction heating coil.

2. The induction heating assembly according to claim 1, wherein the movable coil is arranged to expand in the longitudinal direction of the induction heating coil when current is flowing through the induction heating coil to thereby increase a winding pitch of the induction heating coil.

3. The induction heating assembly according to claim 1, wherein the movable coil is made of a shape memory alloy.

4. The induction heating assembly according to claim 1, wherein the movable coil is made of a bimetallic strip.

5. The induction heating assembly according to claim 1, wherein the movable coil is electrically isolated from the induction heating coil.

6. The induction heating assembly according to claim 1, further comprising a first coil retaining wall at the first end of the induction heating coil and a second coil retaining wall at a second end of the induction heating coil and the movable coil.

7. The induction heating assembly according to claim 6, wherein the induction heating coil is arranged such that a first gap is formed between a terminating winding of the induction heating coil and the second coil retaining wall, and wherein the movable coil is arranged such that a second gap is formed between a terminating winding of the movable coil and the first coil retaining wall, wherein the first gap is larger than the second gap, and wherein when current is flowing through the induction heating coil, the movable coil is configured to expand towards the second coil retaining wall to thereby expand the induction heating coil towards the second coil retaining wall.

8. The induction heating assembly according to claim 1, further comprising a second movable member, the second movable member is an induction heatable element arranged to penetrate through the base portion of the heating compartment with a first end protruding in the heating compartment, and an expandable member arranged such that one end of the expandable member is coupled to a second end of the induction heatable element.

9. The induction heating assembly according to claim 8, wherein the expandable member is arranged to expand as the temperature of the expandable member increases when current is flowing through the induction heating coil to thereby push the induction heatable element further into the heating compartment.

10. The induction heating assembly according to claim 9, wherein the expandable member is arranged to be thermally coupled to the second end of the induction heatable element.

11. The induction heating assembly according to claim 9, wherein the expandable member is arranged to be inductively heated by the induction heating coil.

12. The induction heating assembly according to claim 8, wherein the expandable member is arranged to be thermally coupled to the second end of the induction heatable element.

13. The induction heating assembly according to claim 8, wherein the expandable member is arranged to be inductively heated by the induction heating coil.

14. The induction heating assembly according to claim 8, wherein the induction heatable element is a blade or a needle and is arranged to, when the elongated member is inserted into the heating compartment, pierce a bottom portion of the elongated member.

15. The induction heating assembly according to claim 8, further comprising an electric power source configured to supply a regulated current flowing to the induction heating coil such that a second end of the induction heating coil tracks the movement of the induction heatable element.

16. A vapour generating device comprising the induction heating assembly according to claim 1.

17. The induction heating assembly according to claim 1, further comprising a second movable member, the second movable member is a susceptor arranged to penetrate through the base portion of the heating compartment with a first end protruding in the heating compartment, and a spring arranged such that one end of the spring is coupled to a second end of the susceptor.

18. The induction heating assembly according to claim 17 wherein the spring is a bimetallic leaf spring.

19. An induction heating assembly for a vapour generating device, the induction heating assembly comprising:

an outer wall;

an induction heating coil arranged inward of the outer wall and extending along the outer wall;

a heating compartment defined inward of the outer wall and comprising a base portion at a first end of the induction heating coil and having an opening opposite of the base portion and arranged to receive, in use, via the opening, an elongated member to be heated by induction heating; and a moveable coil arranged to move in a longitudinal direction of the induction heating coil when a current is flowing through the induction heating coil, wherein the movable coil is arranged such that at least one winding of the movable coil is arranged between two adjacent windings of the induction heating coil.

20. The induction heating assembly according to claim 19, further comprising a susceptor arranged to penetrate through the base portion of the heating compartment with a first end protruding in the heating compartment, and a spring arranged such that one end of the spring is coupled to a second end of the susceptor.

* * * * *